US012035309B2

(12) United States Patent
Sanders et al.

(10) Patent No.: US 12,035,309 B2
(45) Date of Patent: Jul. 9, 2024

(54) DYNAMIC CELL RANGE EXTENSION IN A TIME DIVISION DUPLEXING AIR INTERFACE (71) Applicant: VERIZON PATENT AND LICENSING INC., Basking Ridge, NJ (US)

(72) Inventors: Susan Wu Sanders, Bridgewater, NJ (US); Xin Wang, Morris Plains, NJ (US); Nischal Patel, Hillsborough, NJ (US); Monte Giles, Chester, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 80 days.

(21) Appl. No.: 17/242,400

(22) Filed: Apr. 28, 2021

(65) Prior Publication Data

US 2022/0353888 A1 Nov. 3, 2022

(51) Int. Cl.
*H04W 72/1273* (2023.01)
*H04L 5/14* (2006.01)
*H04W 16/24* (2009.01)
*H04W 72/0446* (2023.01)
*H04W 72/12* (2023.01)

(52) U.S. Cl.
CPC ....... *H04W 72/1273* (2013.01); *H04L 5/1469* (2013.01); *H04W 72/0446* (2013.01); *H04W 16/24* (2013.01); *H04W 72/12* (2013.01)

(58) Field of Classification Search
CPC .......................... H04W 72/1273; H04L 5/1469
See application file for complete search history.

(56) References Cited

U.S. PATENT DOCUMENTS

| | | | | |
|---|---|---|---|---|
| 2011/0103499 A1* | 5/2011 | Cheng | ............... | H04W 56/0045 455/517 |
| 2013/0286953 A1* | 10/2013 | Ye | ..................... | H04W 56/0045 370/329 |
| 2014/0226575 A1* | 8/2014 | Davydov | .............. | H04L 5/0037 370/329 |
| 2015/0271763 A1* | 9/2015 | Balachandran | ... | H04W 52/0219 370/338 |
| 2016/0020891 A1* | 1/2016 | Jung | ..................... | H04L 5/0064 370/280 |

(Continued)

OTHER PUBLICATIONS

Raaf et al., On the Selection of Guard Period and Cyclic Prefix for Beyond 4G TDD RAN, Apr. 2013 (Year: 2013).*

(Continued)

*Primary Examiner* — Jae Y Lee
*Assistant Examiner* — Aixa A Guadalupe Cruz (57) ABSTRACT

A base station device dynamically adjusts the configuration of a special slot when operating in a time division duplexing (TDD) mode. The base station can initially communicate with a user equipment (UE) using a first frequency in a time division duplexing (TDD) mode. Using, for example, a timing advance procedure, the base station can determine when the UE requires an expanded cell range (e.g., if the UE is at the cell range edge). In response, the base station adjusts a configuration of a special slot for the UE. The adjustment to the special slot can comprise an addition of a gap symbol, a prioritizing of uplink transmissions over downlink transmissions, or a reserving of one or more downlink symbols during scheduling.

20 Claims, 8 Drawing Sheets

(56) References Cited

U.S. PATENT DOCUMENTS

2018/0262319 A1* 9/2018 Xing ................. H04W 72/0446
2018/0279334 A1* 9/2018 Lim ................... H04L 27/2607

OTHER PUBLICATIONS

Mairton et al., Full Duplex and Dynamic TDD: Pushing the Limits of Spectrum Reuse in Multi-Cell Communications, Feb. 2021 (Year: 2021).*

* cited by examiner

DYNAMIC CELL RANGE EXTENSION IN A TIME DIVISION DUPLEXING AIR INTERFACE

BACKGROUND INFORMATION

In a cellular radio access network (RAN), a base station can use time division duplexing (TDD) to re-use a single frequency band for both uplink and downlink communications. To accommodate both directions, such a base station may divide radio frames into a number of slots to accommodate both uplink and downlink traffic.

DETAILED DESCRIPTION OF EXAMPLE EMBODIMENTS

In a cellular network employing TDD, a single frequency can be divided into a number of frames, and each frame can be divided into a number of slots. Each slot can include a number of symbols. In such a network, each slot can be assigned as an uplink, downlink, or special slot. In an uplink slot, each symbol can be used for uplink traffic, while in a downlink slot, each symbol can be used for downlink traffic. In a special slot, symbols can be allocated for downlink traffic or uplink traffic. Additionally, in a special slot, some symbols can be allocated as gap (or guard) symbols. These gap symbols can be used to implement a guard period between uplink and downlink symbols to ensure minimal interference.

In existing network deployments, the symbol configuration of special slots can limit the cell range of base stations. If a special slot includes a small number of gap symbols, the coverage area of a base station is reduced. Conversely, if a special slot includes a large number of gap symbols, the base station can support a larger coverage area but at a reduced spectrum efficiency. In current networks, special slot configuration is static and set by the mobile network operator. As such, current cellular networks may suffer from either reduced coverage area or reduced spectrum efficiency.

The example embodiments disclosed herein remedy these and similar problems by providing techniques for dynamically adjusting a special slot configuration based on monitored network conditions. In contrast to existing networks, the example embodiments may support a large cell range without sacrificing spectrum efficiency.

A base station device dynamically adjusts the configuration of a special slot when operating in a TDD mode. The base station may initially communicate with user equipment (UE) using one frequency in a TDD mode. In one embodiment, the base station can default to operating in a TDD mode by assigning a fixed ratio of downlink, uplink, and gap symbols in a given special slot. For example, the special slot may include about ten (10) downlink symbols, approximately two (2) gap symbols, and two (2) uplink symbols to a special slot, wherein the ten (10) downlink symbols occur prior to the two (2) uplink symbols, and the two (2) gap symbols occur between the ten (10) downlink symbols and two (2) uplink symbols. As will be discussed, the base station can dynamically alter the operation of the special slot, in many different combinations and patterns, in response to UE conditions.

Using, for example, a timing advance procedure, the base station can determine when the UE requires an expanded cell range (e.g., if the UE is at the cell range edge). In response, the base station may adjust a configuration of a special slot for the UE according to one or more embodiments discussed herein. The base station may use the timing advance procedure when the UE initiates an attachment to a radio access network or may use the timing advance procedure after the UE attaches to a radio access network.

The base station may utilize a timing advance procedure to determine when to expand a cell range. Using such a procedure, the base station can determine if the distance between the UE and the base station is greater than a pre-defined threshold using a timing advance procedure. If so, the base station may adjust the configuration of the special slot.

In one embodiment, the base station increases the number of gap symbols in the special slot. This may include replacing at least one downlink symbol adjacent to an existing gap symbol with a new gap symbol. Additionally, the base station may implement the strategy by issuing a Radio Resource Control (RRC) reconfigure command to the UE, which identifies the number of gap symbols in the special slot.

In another approach to adjusting the configuration of the special slot, the base station transmits a command to the UE, causing the UE to prioritize uplink transmissions in the special slot over downlink transmissions. In another embodiment, a UE may independently prioritize uplink transmissions in the special slot over downlink transmissions without an explicit signal from the base station. Alternatively, or in addition, the base station can implement a different approach, wherein it reserves at least one downlink symbol adjacent to a gap symbol in the special slot. The base station can then disable the scheduling of downlink transmissions in at least one downlink symbol.

Figure 1:
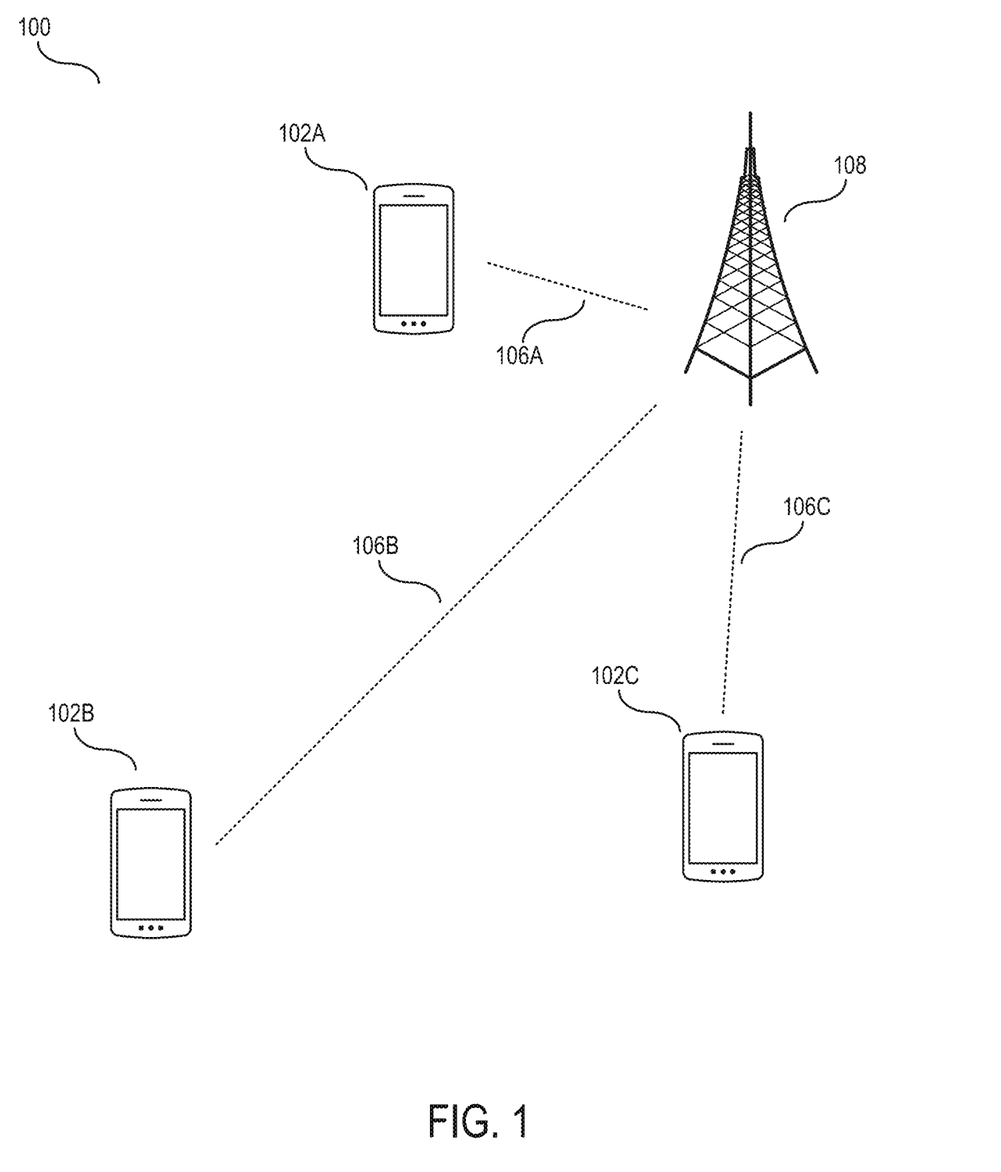
FIG. 1 is a block diagram of a radio access network according to some embodiments.

FIG. 1 is a block diagram of a radio access network 100 according to some embodiments.

In the illustrated radio access network 100, a plurality of UEs, including UE 102A, UE 102B, and UE 102C, communicate with base station 108. In the illustrated embodiment, each UE is a specific distance from the base station 108. For instance, UE 102A is at a distance 106A from the base station 108, UE 102B is at a distance 106B from the base station 108, and UE 102C is at a distance 106C from the base station 108.

In the illustrated embodiment, base station 108 can be configured to monitor the distances (e.g., 106A-106C) of each UE (e.g., 102A-102C) from the base station 108. In one embodiment, the base station 108 uses a timing advance procedure to determine the distances (e.g., 106A-106C). In some embodiments, the base station 108 can store the distances (e.g., 106A-106C) in a local memory device. In one embodiment, the base station 108 can classify distances (e.g., 106A-106C), and thus UEs (e.g., 102A-102C) as needing extended cell range coverage. For example, the base station 108 can determine that distances 106A and 106C are below a threshold, and thus UE 102A and 102C do not require extended cell range. However, the base station 108 can similarly determine that distance 106B is above the same threshold and determine that UE 102B requires extended cell range functionality. As graphically illustrated, distance 106B is larger than distance 106A and distance 106C. As a result, UE 102B is necessarily further away from base station 108. In existing RAN implementations, UE 102B can experience significant interference due to the larger propagation delay it experiences due to the larger distance 106B compared to UE 102A and UE 102C.

Figure 2:
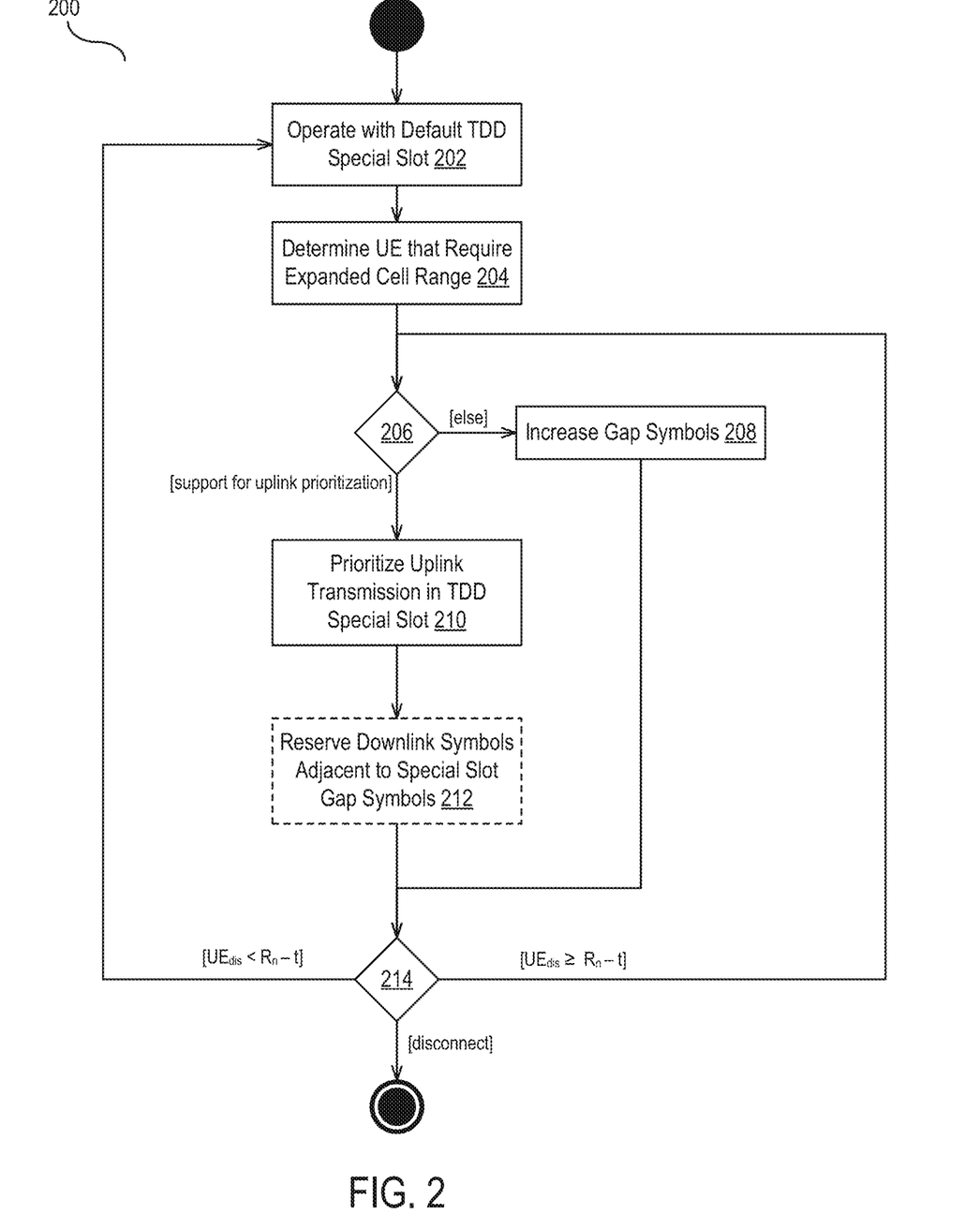
FIG. 2 is a flow diagram illustrating a method for extending the cell range of a base station according to some embodiments.

FIG. 2 is a flow diagram illustrating a method 200 for extending the cell range of a base station according to some embodiments.

In step 202, the method 200 can include operating a RAN with a default TDD special slot.

In one embodiment, a base station can communicate with a UE using one frequency in a TDD mode. In the illustrated embodiment, a TDD mode can comprise a mode of a base station utilizing duplex communication links. In such a mode, an uplink can be separated from a downlink by the allocation of different time slots (also referred to as sub-frames) in the same frequency band. Thus, a TDD mode can allow for asymmetric flow for uplink and downlink data transmission. In the illustrated embodiment, the base station can allocate time slots to UE for uplink and downlink transmission.

In one embodiment, a base station can transmit data according to pre-configured intervals or frames (or radio frames). Each frame can include a number of slots or sub-frames that dictate the types of transmission (e.g., uplink or downlink) allocated in the frame. In one embodiment, a radio frame can include various permutations of uplink, downlink, and special slots. Each slot includes a number of symbols that can correspond to individual transmissions. For example, a given radio frame could include ten slots, and each slot may include fourteen symbols. In one embodiment, each frame includes a permutation of uplink, downlink, and special slots. One example permutation wherein three downlink slots are followed by one special slot, and one uplink slot (referred to as a DDDSU permutation) is depicted in slots 320 of radio frame 300 in FIG. 3; however, the disclosure is not limited to a specific permutation. Indeed, any slot permutation can be used provided that at least one special slot is present in a given radio frame.

In one embodiment, uplink slots can be dedicated for uplink transmissions, and downlink slots can be dedicated for downlink transmissions. As used herein, an uplink transmission refers to a transmission from a UE to a base station, while a downlink transmission refers to a transmission from the base station to the UE. In some embodiments, a special slot can include a mixture of uplink transmission and downlink transmissions, as well as gap symbols where no data is transmitted.

Figure 3:
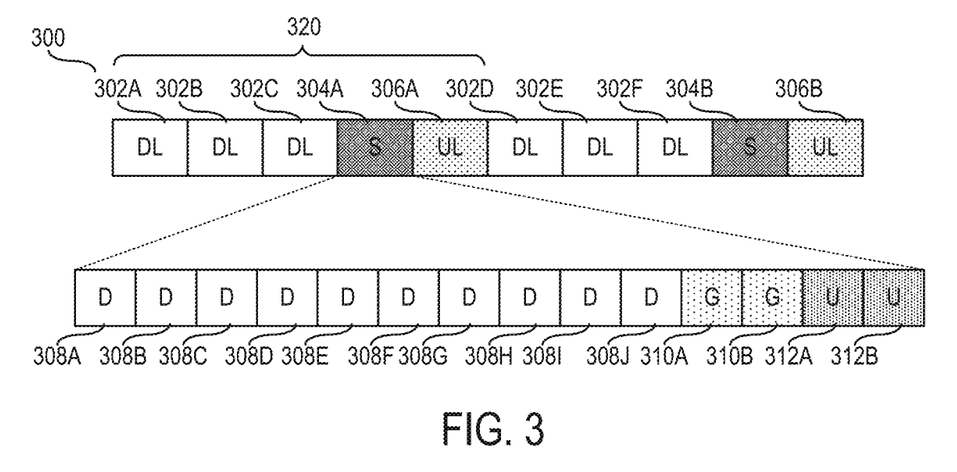
FIG. 3 is a block diagram illustrating a special slot format according to some embodiments.

During step 202, the method 200 can transmit and receive data using the frame format (DDDSU) depicted in FIG. 3. As illustrated, a given radio frame 300 includes ten slots (302A, 302B, 302C, 304A, 306A, 302D, 302E, 302F, 304B, 306B). In a DDDSU arrangement, slot 302A, slot 302B, and slot 302C are downlink slots; slot 304A is a special slot; and slot 306A is an uplink slot. Similarly, slot 302D, slot 302E, and slot 302F are downlink slots; slot 306B is an uplink slot; and slot 304B is a special slot. In the illustrated embodiment, each downlink slot (302A, 302B, 302C, 302D, 302E, 302F) includes 14 downlink symbols while each uplink slot (306A, 306B) includes 14 uplink symbols.

In the illustrated embodiment, special slots (304A, 304B) may include ten downlink symbols (308A-308J), two (2) gap symbols (310A, 310B), and two uplink symbols (312A, 312B). In the illustrated embodiment, during the special slots (304A, 304B) data can be transmitted to a base station from a UE in the uplink symbols (312A, 312B) and transmitted by the base station to the UE in downlink symbols (308A-308J). In the illustrated embodiment, gap symbols (310A, 310B) enable UE to switch from downlink to uplink and allow timing advance in the uplink, as discussed herein.

In step 204, the method 200 determines if a given UE requires an expanded cell range. In one embodiment, determining that the UE requires an expanded cell range comprises determining if a distance to the UE is greater than a pre-defined threshold using a timing advance procedure.

In the illustrated embodiment, Timing Advance (TA) can comprise a command sent by a base station to UE to adjust its uplink transmission, causing the UE to send uplink symbols in advance (e.g., during PUSCH, PUCCH, or SRS transmission). In some embodiments, the Timing Advance Command (TAC) informs the UE of the amount of time that it needs to advance the uplink transmissions. In some embodiments, the base station can estimate the initial timing advance from PRACH sent by the UE. In such an embodiment, PRACH is used as a timing reference for uplink during UE's initial access, radio link failure, handover, etc. Further, the base station can send a TAC in a Random Access Response (RAR). In some embodiments, once the UE is in connected mode, the base station can continue to estimate the TA and sends a TAC medium access control (MAC) Control Element (CE) to the UE if correction is required. In some embodiments, the base station can use the TA procedure to determine the propagation delay of a signal between the base station and a UE. Since the UE are at various distances from the base station and radio waves travel at the finite speed of light, the precise arrival time within the slot can be used by the base station to determine how far the UE is from the base station (e.g., 106A, 106B, 106C).

In some embodiments, the method 200 can thus periodically determine the distance of each UE from the base station. In some embodiments, the method 200 additionally stores and an actual or theoretical coverage range of the base station (e.g., a distance from the base station in which normal coverage is possible). Thus, in one embodiment, the method 200 can compare the UE distance detected via the TA process with the normal coverage of the base station to determine if the UE requires expanded cell coverage. For example, if the normal cell range is $R_n$, the method 200 can determine if a UE distance ($UE_{dis}$) is within a preset threshold (t) of the normal cell range ($R_n$). Thus, the method 200 determines if $UE_{dis} \geq R_n - t$. If $UE_{dis} < R_n - t$ for a given UE, the method 200 can continue to operate in a normal TDD mode (step 202). If, however, the method 200 determines that $UE_{dis} \geq R_n - t$, the method 200 proceeds to step 206. Alternatively, or additionally, the method 200 can determine if $UE_{dis} > R_n$ to determine whether to expand cell range.

In some embodiments, the method 200 can continuously monitor the UE distance ($UE_{pos}$) and determine whether the UE is moving away from a base station. In this embodiment, the method 200 can proactively determine that the UE needs expanded cell range. In such an embodiment, the method 200 can monitor the vector (e.g., direction and speed) to determine when proceeding to step 206 is necessary.

In the illustrated embodiment, most UE attached to a base station executing the method 200 will operate within a normal cell coverage range (i.e., they will be near to the base station). Thus, in the illustrated embodiment, the method 200 can default to utilizing a standard special slot configuration for all UE until expended cell coverage is needed as detected using the above process. In some embodiments, the method 200 continuously performs step 204 for each UE (e.g., during both initial access and during data communications after initial access).

In step 206, the method 200 can comprise determining if a UE supports prioritizing uplink transmission over downlink transmission.

In one embodiment, step 206 can comprise determining if the UE supports prioritizing Physical Uplink Control Channel (PUCCH) over Physical Downlink Shared Channel (PDSCH) reception. In one embodiment, the method 200 can receive a listing of capabilities of a UE when the UE attaches to the cellular network. In one embodiment, these capabilities can include a capability of a UE to prioritize uplink over downlink transmissions in a special slot. In some embodiments, this capability can be defined per-UE or can be mandated by a mobile network operator (MNO). In one embodiment, prioritizing uplink over downlink transmission can comprise a UE choosing to transmit data to a base station in an uplink symbol even if such a transmission results in the loss of a downlink symbol. For example, in FIG. 3, as the distance between a UE and base station increases, a final download symbol (308J) in a special slot (304) can be significantly delayed. Thus, a UE can either decode this symbol and potentially miss transmitting uplink symbols (312A or 312B) or drop the downlink symbol (308J) and ensure the transmission of uplink symbols (312A, 312). If a UE prioritizes uplink transmission, it can attempt to decode the final downlink symbol (308J); however, if the UE cannot decode and process the downlink symbol before the allocated time to transmit uplink symbol (312A), the UE can then drop the downlink symbol (308J) to ensure transmission of the first uplink symbol (312A). In this prioritization, the UE can rely on a Hybrid Automatic Repeat Request (HARQ) mechanism to ensure the retransmission of the dropped symbol (308). In one embodiment, the method 200 receives the above capability from a UE during an RRC attachment procedure. As such, the method 200 can cache this information and associate it with a UE to enable the decision in step 206.

In step 208, the method 200 determines that the UE does not support prioritization of uplink transmissions and increases the number of gap symbols. This scenario is illustrated, for example, in the radio frame 400 depicted in FIG. 4. Specifically, in a special slot 404 used for the UE, the method 200 may replace one or more downlink symbols (e.g., 308J) with an extra gap symbol 402. Thus, in contrast to FIG. 3, the radio frame 400 includes three gap symbols 402, 310A, 310B. As illustrated, in one embodiment, the last downlink symbol (308J) in the special slot 404 is replaced with a gap symbol 402 to increase the distance between downlink symbols (308A-308I) and uplink symbols (312A, 312B). In this scenario, the cell range is increased to a value $R_L$ where $R_L > R_n$. Specifically, the extra gap symbols ensure that a UE further from the base station can receive and transmit data without interference or loss of data.

In one embodiment, step 208 can comprise transmitting an RRC reconfigure (RRC CONNECTION RECONFIGURATION) message to the UE needing an expanded cell range. Specifically, the RRC reconfigure message can include the number of extra gap symbols and their position in the special slot. In the illustrated embodiment, since the RRC reconfigure message is sent on a per-UE basis, the method 200 can increase cell range for specific UE while operating in a normal mode for other UE not requiring such expanded cell range (i.e., UE closer to the base station).

If the method 200 determines, in step 206, that the UE supports prioritizing uplink transmission over downlink transmission, in step 210, the method prioritizes uplink transmission in a TDD special slot.

In one embodiment, step 210 can comprise prioritizing uplink symbols in a special slot over the complete processing of a downlink symbol. For example, a UE can prioritize the transmission of uplink symbols 312A, 312B and de-prioritize decoding and processing a final downlink symbol 308J. In one embodiment, step 210 can comprise a base station instructing a UE to begin prioritizing uplink symbols. In another embodiment, the UE can initiate a re-prioritization on its own. In some embodiments, the UE can initiate the re-prioritization in response to receiving a measurement (e.g., $UE_{pos}$) from a base station. In the illustrated embodiment, when a UE prioritizes uplink transmission in a special slot, some downlink symbols can be lost. As discussed, the UE and base station can rely upon HARQ retransmissions to ensure that all downlink symbols are ultimately received.

In step 212, the method 200 can optionally include reserving one or more downlink symbols in a special slot, the one or more reserved downlink symbols adjacent to a gap symbol.

Figure 5:
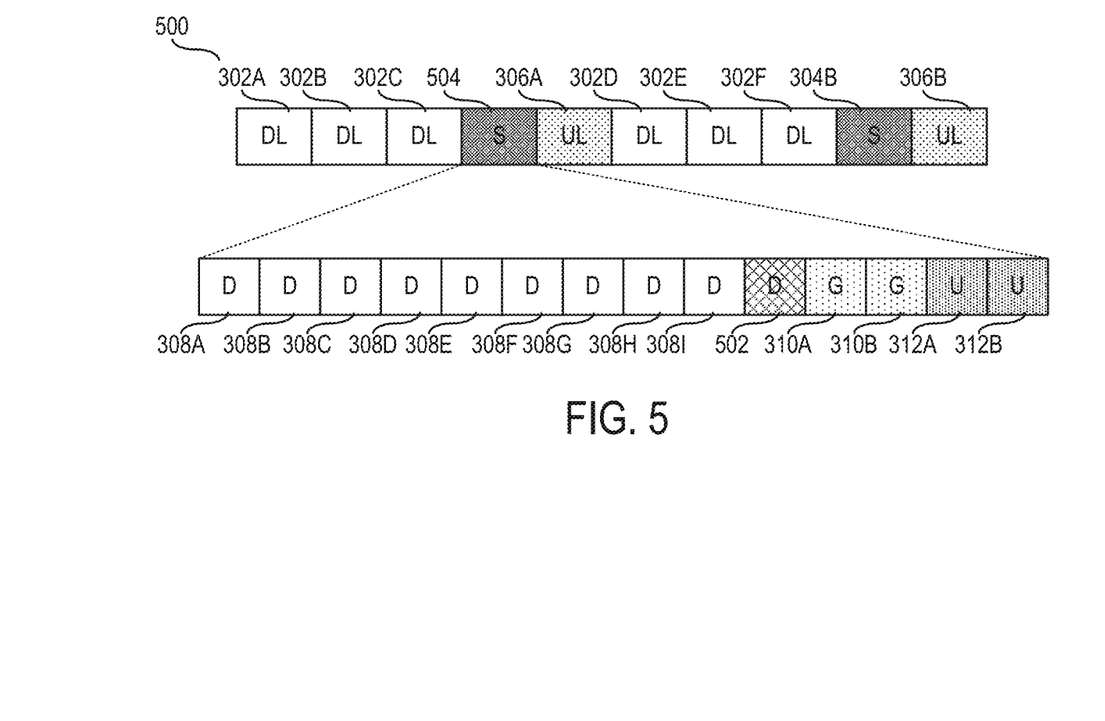
FIG. 5 is a block diagram illustrating a special slot format for extending the cell range of a base station according to some embodiments.

As illustrated in FIG. 5, a reserved downlink symbol 502 is identified in a special slot 504 of radio frame 500 by identifying a downlink symbol adjacent to a gap symbol 301a. In the illustrated embodiment, only one reserved downlink symbol 502 is identified, however, in some embodiments, downlink symbol 308I may be identified as a reserved symbol and so forth. In the illustrated embodiment, the special slot 504 configuration is not modified. However, the method 200 may prevent scheduling of downlink transmissions in reserved downlink symbol 502. As such, in the special slot 304A, downlink symbols 308A-308I will be scheduled normally, and reserved downlink symbol 502 will not be scheduled. Since, in the illustrated embodiment, the UE is prioritizing uplink symbols at the expense of, at least, reserved downlink symbol 502, the method 200 can avoid retransmissions of reserved downlink symbol 502 by not scheduling downlink transmissions.

Figure 4:
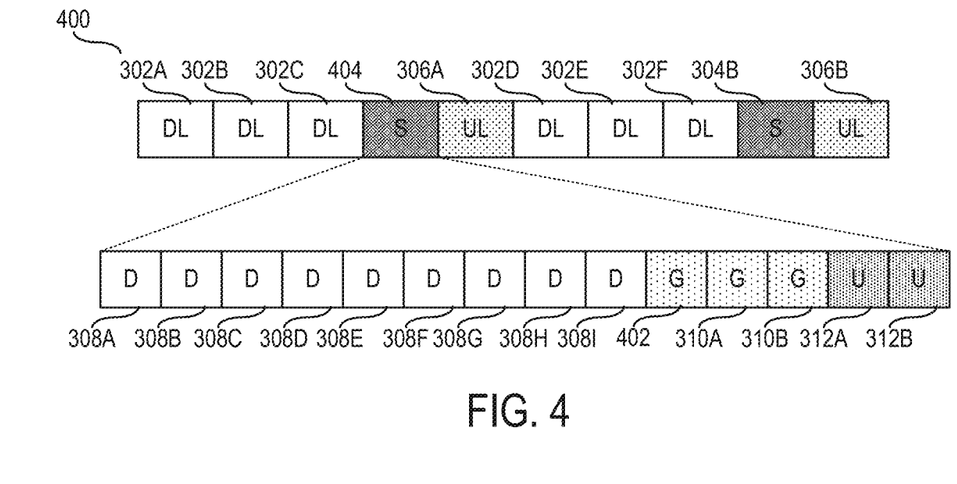
FIG. 4 is a block diagram illustrating a special slot format for extending the cell range of a base station according to some embodiments.

In the illustrated embodiment, step 212 can be optional. However, when implemented, disabling the scheduling of one or more downlink symbols adjacent to a gap symbol can prevent HARQ retransmissions since no data is dropped by the UE in the reserved downlink symbol 502. Further, in such an embodiment, the method 200 does not modify the configuration of the special slot 504 (as compared to special slot 404), so no signaling (e.g., RRC reconfiguration) may be needed to implement an extended guard period.

In step 214, the method 200 can comprise determining whether to return to a default TDD mode or continue to support an expanded cell range. Specifically, in the illustrated embodiment, the method 200 can comprise determining if the UE has moved closer to the base station (i.e., $UE_{dis} < R_n - t$). If so, the method 200 can determine that the UE has moved close enough to the base station to utilize a default TDD special slot format (step 202). Alternatively, if the UE remains beyond the normal range of the base station (i.e., $UE_{dis} \geq R_n - t$), the method 200 can continue to operate in an expanded cell range starting with step 206. Finally, the method 200 can terminate upon detecting that a UE has moved outside of expanded cell range coverage (e.g., has initiated a handover to an adjacent base station).

In the illustrated embodiment, steps 208, 210, and 212 are illustrated as being executed as part of the same process. However, in some embodiments, the method 200 can execute a single one of step 208, 210, and 212 after step 204. That is, in some embodiments, the method 200 may include executing steps 202, 204 and one of steps 208, 210, or 212 (omitting step 206). The method 200 may end then after executing steps 208, 210, or 212.

If the method 200 executes step 208 immediately after step 204, the method 200 always issues a reconfiguration messages and modifies the special slot 404 format. Alternatively, if the method 200 executes steps 208 or 210 immediately after step 204, the method 200 may require that all UE supports uplink prioritization.

Figure 6:
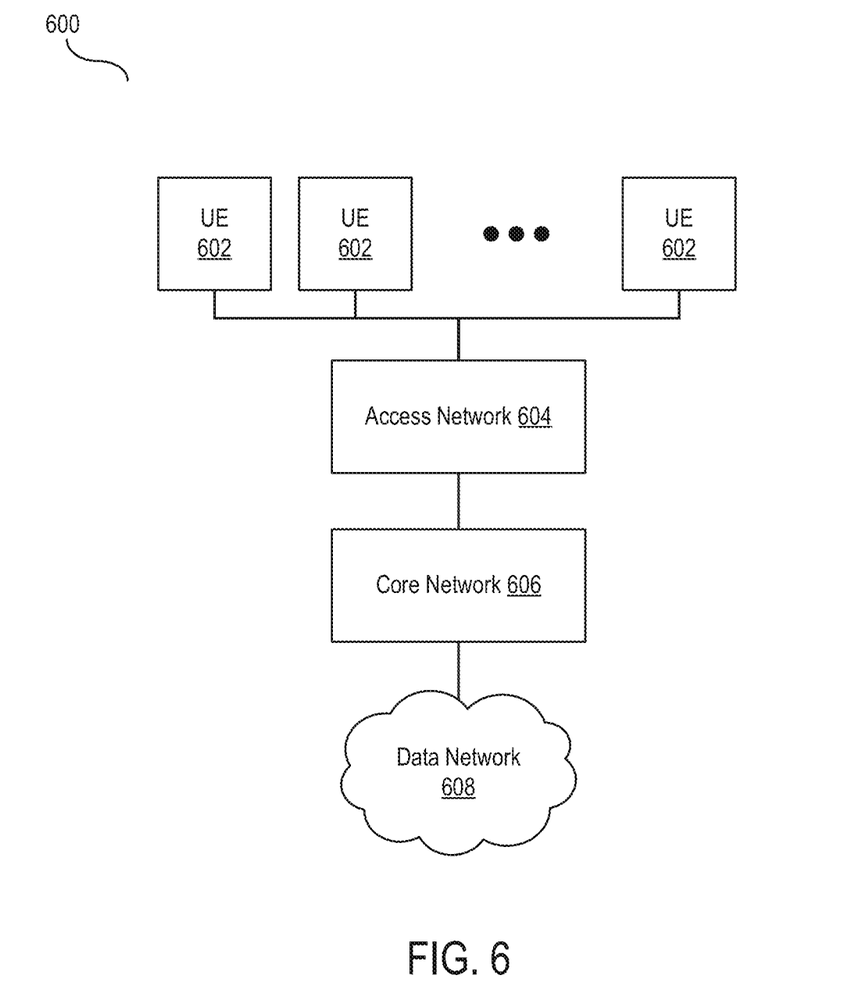
FIG. 6 is a block diagram of a cellular network according to some embodiments.

FIG. 6 is a block diagram of a cellular network according to some embodiments.

In the illustrated embodiment, a system 600 includes UE 602 that accesses a data network 608 via an access network 604 and a core network 606. In the illustrated embodiment, UE 602 comprises any computing device capable of communicating with the access network 604. As examples, UE 602 can include mobile phones, tablets, laptops, sensors, Internet of Things (IoT) devices, and any other devices equipped with a cellular transceiver. One example of a UE is provided in FIG. 8.

In the illustrated embodiment, the access network 604 comprises a network allowing over-the-air network communication with UE 602. In general, the access network 604 includes at least one base station that is communicatively coupled to the core network 606 and wirelessly coupled to zero or more UE 602.

In one embodiment, the access network 604 comprises a fifth-generation (5G) cellular access network. In one embodiment, the access network 604 and UE 602 comprise a NextGen Radio Access Network (NG-RAN). In an embodiment, the access network 604 includes a plurality of next Generation Node B (gNodeB) base stations connected to UE 602 via an air interface. In one embodiment, the air interface comprises a New Radio (NR) air interface. In some embodiments, an NR interface utilizes a cyclic prefix orthogonal frequency-division multiple access (CP-OFDM) downlink modulation scheme and either CP-OFDM or discrete Fourier transform spread orthogonal frequency division multiplexing (DFT-s-OFDM) uplink modulation scheme. In these embodiments, the gNodeB provides all functionality to implement and operate the air interface and negotiates uplinks and downlinks with the UE 602. The gNodeB can additionally include multiple network interfaces for communicating with the core network 606. In one embodiment, the gNodeB includes an interface to communicate with a mobility manager (e.g., an AMF) and a second interface to communicate with one or more gateway elements in the core network 606, such as a Session Management Function (SMF) for control data or a User Plane Function (UPF) for user data. In one embodiment, the mobility manager manages control plane traffic while the gateway elements manage user data traffic, as will be discussed. In some embodiments, base stations in the access network 604 are communicatively connected. For example, in a 5G network, individual gNodeB devices can be communicatively coupled via an X2 interface.

In one embodiment, the access network 604 comprises a fourth-generation (4G) cellular access network. In some embodiments, the access network 604 comprises an LTE access network. In one embodiment, the access network 604 and UE 602 comprise an Evolved Universal Mobile Telecommunications System (UMTS) Terrestrial Radio Access Network (E-UTRAN). In an embodiment, the access network 604 includes a plurality of Evolved Node B (eNodeB) base stations connected to UE 602 via an air interface. In one embodiment, the air interface comprises an E-UTRAN Uu or LTE Uu radio air interface. In some embodiments, an E-UTRAN Uu interface utilizes an orthogonal frequency-division multiple access (OFDMA) downlink modulation scheme and a single-carrier frequency-division multiple access (SC-FDMA) uplink modulation scheme. In these embodiments, the eNodeB provides all functionality to implement and operate the air interface and negotiates uplinks and downlinks with the UE 602. The eNodeB can additionally include multiple network interfaces for communicating with the core network 606. In one embodiment, the eNodeB includes an interface to communicate with a mobility manager (e.g., a Mobility Management Entity, MME) and a second interface to communicate with one or more gateway elements in the core network 606 such as a Serving Gateway (S-GW) or Packet Data Network Gateway (P-GW). In one embodiment, the mobility manager manages control plane traffic while the gateway elements manage user data traffic, as will be discussed. In some embodiments, base stations in the access network 604 are communicatively connected. For example, in a 4G network, individual eNodeB devices can be communicatively coupled, for example via an X2 interface or any other interface.

In some embodiments, the access network 604 can operate in a dual-connectivity mode wherein a single UE 602 connects to multiple base stations in the access network 604 simultaneously. In some embodiments, dual connectivity can be implemented via New Radio Dual Connectivity (NR-DR), E-UTRA-NR Dual Connectivity (EN-DC), NG-RAN-E-UTRA-NR Dual Connectivity (NGEN-DC), or NR-E-UTRA Dual Connectivity (NE-DC).

In the illustrated embodiment, the access network 604 provides access to a core network 606 to the UE 602. In the illustrated embodiment, the core network can be owned and/or operated by an MNO and provides wireless connectivity to UE 602. In the illustrated embodiment, this connectivity can comprise voice and data services. The core network 606 includes various computing devices, which are described briefly herein. Further detail of such devices is provided in FIG. 7.

At a high-level, the core network 606 can include a user plane and a control plane. In one embodiment, the control plane comprises network elements and communications interfaces to allow for the management of user connections and sessions. By contrast, the user plane can comprise network elements and communications interfaces to transmit user data from UE 602 to elements of the core network 606 and to external network-attached elements in a data network 608 such as the Internet. An example of a control plane function comprises authenticating that a user can access the core network 606 (i.e., is a subscriber to the MNO). An example of a user plane function is the request and receipt of data from an external web server (e.g., via a web browser on a UE). Many other examples exist in a 4G or 5G network, and the foregoing examples are not intended to be limiting.

Generally, the core network 606 can include a mobility manager, one or more gateways (e.g., a serving gateway and packet gateway), and a subscriber database. In practice, the core network 606 can include more components than these.

In a 4G network, the mobility manager can be implemented by an MME, the serving gateway by an S-GW, the packet gateway by a P-GW, and the subscriber database by a home subscriber server (HSS). In a 5G network, the mobility manager can be implemented by an AMF, SMF, and an Authentication Server Function (AUSF). Specifically, the AMF performs mobility management while the SMF performs session management, both of which are described herein. Further, the AUSF obtains authentication vectors from a subscriber database. In a 4G network, the MME performs all of these functions. The serving gateway in a 5G network can be implemented by the SMF as well. Specifically, packet routing from the base station to the packet gateway can be handled by the SMF in contrast to the S-GW in a 4G network. In a 5G network, the packet gateway can be implemented by the UPF, which provides packet routing from the serving gateway to external services and manages Internet Protocol (IP) address allocation as well as content filtering and blocking. In a 5G network, the subscriber database can be implemented by a Unified Data Repository (UDR), which stores the subscriber data. Access to the UDR can be mediated by Unified Data Management (UDM), which is part of the subscriber database, as described herein.

In brief, a UE 602 communicates with the mobility manager to authenticate and establish a session or bearer with the serving and packet gateways. The mobility manager accesses the subscriber data to confirm the UE 602 identity and communicates with the serving gateway to establish the session. Once established, the UE 602 transmits data requests through the session to the packet gateway, which manages the transmitting and receiving data to and from external network services. Specific details of these elements are provided in the following figures.

In the illustrated embodiment, the access network 604 and the core network 606 are operated by an MNO. However, in some embodiments, the networks (104, 106) can be operated by a private entity and can be closed to public traffic. For example, the components of the network 606 can be provided as a single device, and the access network 604 can comprise a small form-factor base station. In these embodiments, the operator of the device can simulate a cellular network, and UE 602 can connect to this network similar to connecting to a national or regional network.

Figure 7:
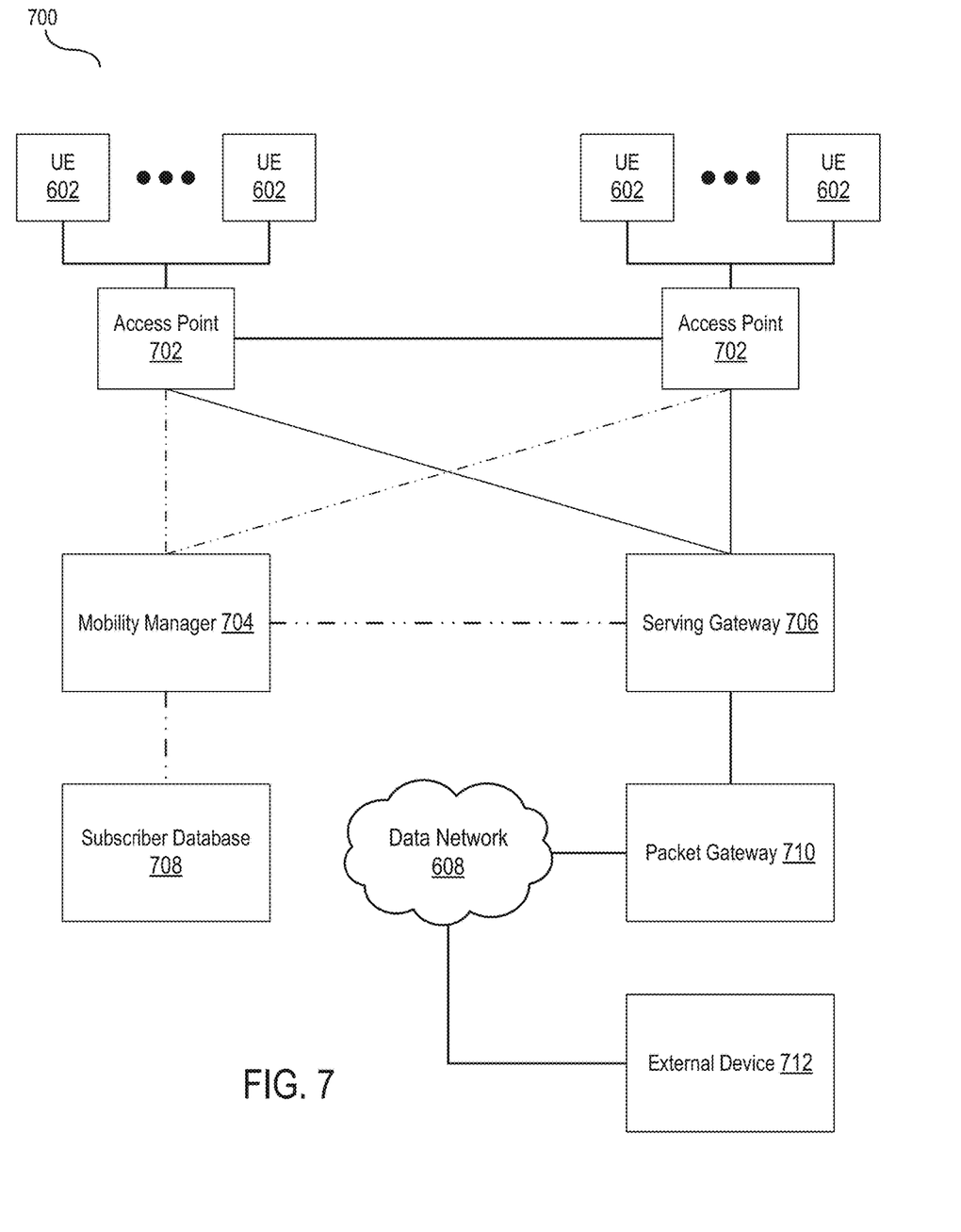
FIG. 7 is a block diagram illustrating a cellular network according to some embodiments.

FIG. 7 is a block diagram illustrating a cellular network according to some embodiments.

In the illustrated embodiment, a system 700 includes UE 602 communicatively connected to access points 702. As seen in FIG. 2, the access points 702 form an access network such as a network 604. In one embodiment, the access points 702 and UE 602 comprise a NextGen Radio Access Network (NG-RAN). In an embodiment, the access points 702 comprise a plurality of gNodeB base stations connected to UE 602 via an air interface. In one embodiment, the air interface comprises a New Radio (NR) air interface. In some embodiments, an NR interface utilizes a cyclic prefix orthogonal frequency-division multiple access (CP-OFDM) downlink modulation scheme and either CP-OFDM or discrete Fourier transform spread orthogonal frequency division multiplexing (DFT-s-OFDM) uplink modulation scheme. In these embodiments, the gNodeB provides all functionality to implement and operate the air interface and negotiates uplinks and downlinks with the UE 602. The gNodeB additionally includes multiple network interfaces for communicating with the core network and, specifically, mobility manager 704 and serving gateway 706. In one embodiment, the mobility manager 704 in a 5G network comprises an AMF. In one embodiment, the serving gateway 706 comprises an SMF for control data or UPF for user data.

In another embodiment, the access points 702 comprise eNodeB base stations connected to UE 602 via an air interface. embodiment, the air interface comprises an E-UTRAN Uu or LTE Uu radio air interface. In some embodiments, an E-UTRAN Uu interface utilizes an orthogonal frequency-division multiple access (OFDM) downlink modulation scheme and a single-carrier frequency-division multiple access (SC-FDM) uplink modulation scheme. In these embodiments, the eNodeB provides all functionality to implement and operate the air interface and negotiates uplinks and downlinks with the UE 602. The eNodeB additionally includes multiple network interfaces for communicating with the core network and, specifically, mobility manager 704 and serving gateway 706. In one embodiment, the mobility manager 704 comprises an MME in a 4G network. In the illustrated embodiment, solid lines between network elements (304, 306, 308, and 310) represent user data traffic while dashed lines between network elements (304, 306, 308, and 310) represent control or non-access stratum (NAS) traffic.

In the illustrated embodiment, the mobility manager 704 manages control plane traffic while the gateway elements (306, 310) manage user data traffic. Specifically, the mobility manager 704 can comprise hardware or software for handling network attachment requests from UE 602. As part of processing these requests, the mobility manager 704 accesses a subscriber database 708. The subscriber database 708 comprises hardware or software that stores user authorization and authentication data and validates users to the network. In some embodiments, the subscriber database 708 can comprise a UDM and UDR in a 5G network. In another embodiment, the subscriber database 708 can comprise an HSS in a 4G network. In one embodiment, the subscriber database 708 can also store a location of the user updated via a Diameter or similar protocol.

The mobility manager 704 can also be configured to create data sessions or bearers between UE 602 and serving gateway 706 or packet gateway 710. In one embodiment, the serving gateway 706 and packet gateway 710 can comprise single or separate devices. In general, the serving gateway 706 routes and forwards user data packets while also acting as the mobility anchor for the user plane during access point handovers and as the anchor for mobility between different network technologies. For idle state UE 602, the serving gateway 706 terminates the downlink data path and triggers paging when downlink data arrives for the UE 602. The serving gateway 706 manages and stores UE 602 contexts, e.g., parameters of the IP bearer service, network internal routing information. In a 5G network, the serving gateway 706 can be implemented by an SMF. In a 4G network, the serving gateway 706 can be implemented by an S-GW.

The serving gateway 706 is communicatively coupled to a packet gateway 710. In general, the packet gateway 710 provides connectivity from the UE 602 to external packet data networks (PDNs) such as data network 608 by being the point of exit and entry of traffic to external networks (e.g., 208). UE 602 can have simultaneous connectivity with more than one packet gateway 710 for accessing multiple packet data networks. The packet gateway 710 performs policy enforcement, packet filtering for each user, charging support, lawful interception, and packet screening. In the illustrated embodiment, the packet gateway 710 also limits access to endpoints such as external device 712. In a 5G network, the packet gateway 710 can be implemented by a UPF. In a 4G network, the packet gateway 710 can be implemented by a P-GW.

In the illustrated embodiment, an external device 712 is communicatively coupled to the core network via the data network 608. In one embodiment, the data network 608 can comprise the Internet. In the illustrated embodiment, the external device 712 can comprise any electronic device capable of communicating with the data network 608 and the disclosure is not limited to specific types of network devices.

As discussed, in some embodiments, UE 602 can alternatively connect to multiple access points 702 in a dual-connectivity arrangement. In this embodiment, such a UE 602 will have multiple data paths through the core network and control and user plane separation (CUPS) can be used to route control and user data traffic.

Figure 8:
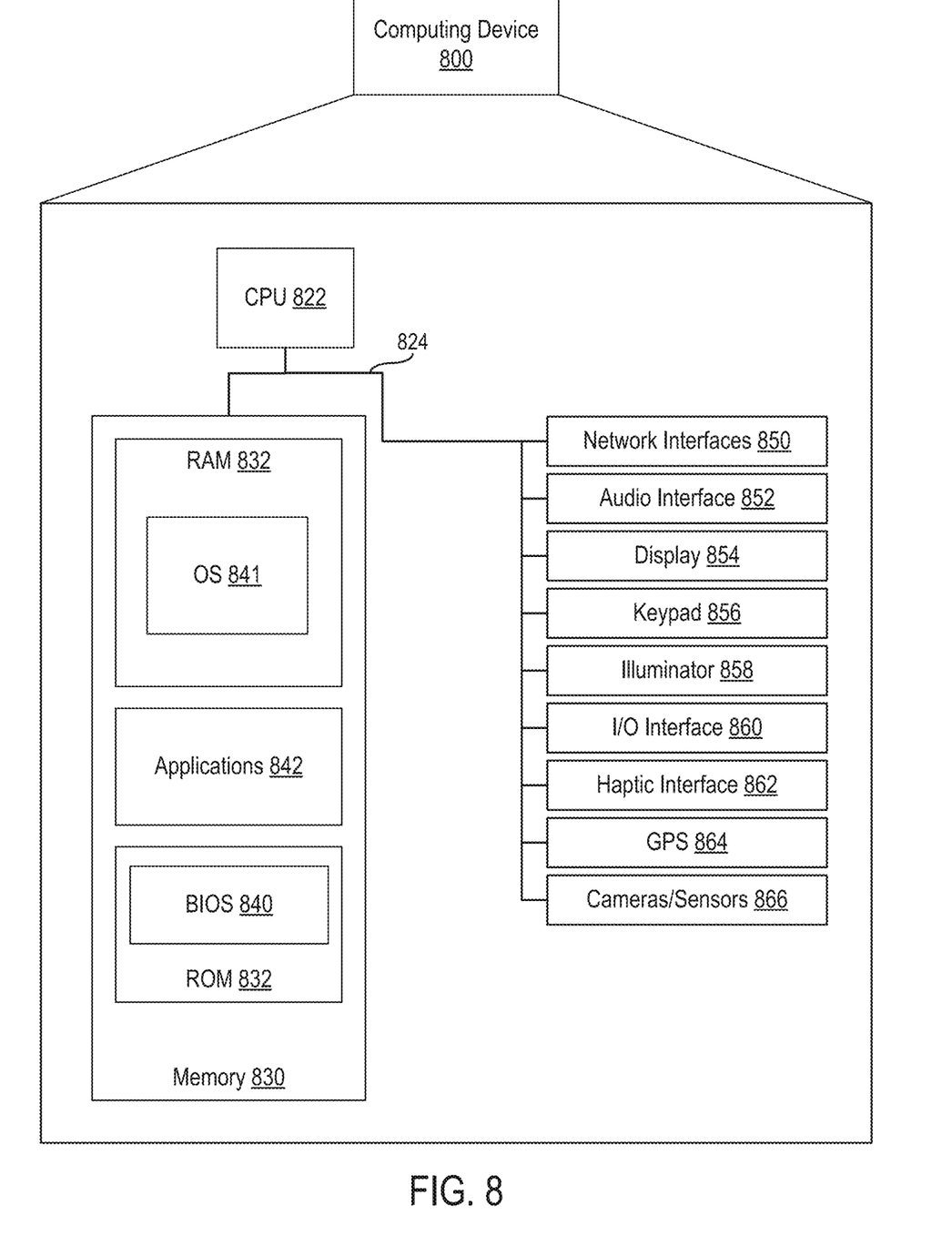
FIG. 8 is a block diagram illustrating a computing device showing an example of a client or server device used in the various embodiments of the disclosure.

FIG. 8 is a block diagram illustrating a computing device showing an example of a client or server device used in the various embodiments of the disclosure.

The computing device 800 can include more or fewer components than those shown in FIG. 8, depending on the deployment or usage of the device 800. For example, a server computing device, such as a rack-mounted server, can omit an audio interface 852, display 854, keypad 856, illuminator 858, haptic interface 862, Global Positioning Service (GPS) receiver 864, or cameras/sensor 866. Some devices can include additional components not shown, such as graphics processing unit (GPU) devices, cryptographic co-processors, artificial intelligence (AI) accelerators, or other peripheral devices.

As shown in the figure, the device 800 includes a central processing unit (CPU) 822 in communication with a mass memory 830 via a bus 824. The computing device 800 also includes one or more network interfaces 850, an audio interface 852, a display 854, a keypad 856, an illuminator 858, an input/output interface 860, a haptic interface 862, an optional global positioning systems (GPS) receiver 864 and a camera(s) or other optical, thermal, or electromagnetic sensors 866. Device 800 can include one camera/sensor 866 or a plurality of cameras/sensors 866. The positioning of the camera(s)/sensor(s) 866 on the device 800 can change per device 800 model, per device 800 capabilities, and the like, or some combination thereof.

In some embodiments, the CPU 822 can comprise a general-purpose CPU. The CPU 822 can comprise a single-core or multiple-core CPU. The CPU 822 can comprise a system-on-a-chip (SoC) or a similar embedded system. In some embodiments, a GPU can be used in place of, or in combination with, a CPU 822. Mass memory 830 can comprise a dynamic random-access memory (DRAM) device, a static random-access memory device (SRAM), or a Flash (e.g., NAND Flash) memory device. In some embodiments, mass memory 830 can comprise a combination of such memory types. In one embodiment, the bus 824 can comprise a Peripheral Component Interconnect Express (PCIe) bus. In some embodiments, the bus 824 can comprise multiple busses instead of a single bus.

Mass memory 830 illustrates another example of computer storage media for the storage of information such as computer-readable instructions, data structures, program modules, or other data. Mass memory 830 stores a basic input/output system ("BIOS") 840 for controlling the low-level operation of the computing device 800. The mass memory also stores an operating system 841) for controlling the operation of the computing device 800

Applications 842 can include computer-executable instructions which, when executed by the computing device 800, perform any of the methods (or portions of the methods) described previously in the description of the preceding Figures. In some embodiments, the software or programs implementing the method embodiments can be read from a hard disk drive (not illustrated) and temporarily stored in RAM 832 by CPU 822. CPU 822 can then read the software or data from RAM 832, process them, and store them to RAM 832 again.

The computing device 800 can optionally communicate with a base station (not shown) or directly with another computing device. Network interface 850 is sometimes known as a transceiver, transceiving device, or network interface card (NIC).

The audio interface 852 produces and receives audio signals such as the sound of a human voice. For example, the audio interface 852 can be coupled to a speaker and microphone (not shown) to enable telecommunication with others or generate an audio acknowledgment for some action. Display 854 can be a liquid crystal display (LCD), gas plasma, light-emitting diode (LED), or any other type of display used with a computing device. Display 854 can also include a touch-sensitive screen arranged to receive input from an object such as a stylus or a digit from a human hand.

Keypad 856 can comprise any input device arranged to receive input from a user. Illuminator 858 can provide a status indication or provide light.

The computing device 800 also comprises an input/output interface 860 for communicating with external devices, using communication technologies, such as USB, infrared, Bluetooth™, or the like. The haptic interface 862 provides tactile feedback to a user of the client device.

The optional GPS receiver 864 can determine the physical coordinates of the computing device 800 on the surface of the Earth, which typically outputs a location as latitude and longitude values. GPS receiver 864 can also employ other geo-positioning mechanisms, including, but not limited to, triangulation, assisted GPS (AGPS), E-OTD, CI, SAI, ETA, BSS, or the like, to further determine the physical location of the computing device 800 on the surface of the Earth. In one embodiment, however, the computing device 800 can communicate through other components, provide other information that can be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter can be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms can have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology can be understood at least in part from usage in context. For example, terms, such as "and", "or", or "and/or," as used herein can include a variety of meanings that can depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, can be used to describe any feature, structure, or characteristic in a singular sense or can be used to describe combinations of features, structures or characteristics in a plural sense. Similarly, terms, such as "a," "an," or "the," again, can be understood to convey a singular usage or to convey a plural usage, depending at least in part upon context. In addition, the term "based on" can be understood as not necessarily intended to convey an exclusive set of factors and may, instead, allow for existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions or steps) that is executable by a computer, in machine readable form. By way of example, and not limitation, a computer readable medium can comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

In the preceding specification, various example embodiments have been described with reference to the accompanying drawings. However, it will be evident that various modifications and changes can be made thereto, and additional embodiments can be implemented without departing from the broader scope of the disclosed embodiments as set forth in the claims that follow. The specification and drawings are accordingly to be regarded in an illustrative rather than restrictive sense.

What is claimed is:

1. A method comprising:
communicating, by a base station, with a user equipment (UE) using a first frequency in a time division duplexing (TDD) mode;
determining, by the base station, that the UE requires an expanded cell range if a distance to the UE is within a threshold distance from a normal cell range of the base station, wherein the distance is determined using a timing advance command; and
adjusting, by the base station, a configuration of a special slot of a radio frame for the UE in response to determining that the UE requires the expanded cell range, the special slot comprising uplink and downlink symbols, the configuration de-prioritizing a final downlink symbol in the special slot.

2. The method of claim 1, wherein adjusting the configuration of the special slot for the UE comprises increasing an amount of gap symbols in the special slot.

3. The method of claim 2, wherein increasing the amount of gap symbols in the special slot comprises replacing at least one downlink symbol adjacent to an existing gap symbol with a new gap symbol.

4. The method of claim 2, wherein increasing the amount of gap symbols in the special slot comprises issuing a Radio Resource Control (RRC) reconfigure command to the UE, the RRC reconfigure command identifying the amount of gap symbols in the special slot.

5. The method of claim 1, wherein adjusting the configuration of the special slot for the UE comprises transmitting a command to the UE causing the UE to prioritize uplink transmissions in the special slot over downlink transmissions.

6. The method of claim 5, wherein adjusting the configuration of the special slot for the UE comprises reserving at least one downlink symbol in the special slot, the at least one downlink symbol adjacent to a gap symbol, wherein reserving the at least one downlink symbol comprises disabling scheduling of downlink transmissions in the at least one downlink symbol.

7. The method of claim 1, wherein the radio frame is configured in a DDDSU permutation.

8. A non-transitory computer-readable storage medium for tangibly storing instructions capable of being executed by a processor, the instructions comprising steps of:
communicating, by a base station, with a user equipment (UE) using a first frequency in a time division duplexing (TDD) mode;
determining, by the base station, that the UE requires an expanded cell range if a distance to the UE is within a threshold distance from a normal cell range of the base station, wherein the distance is determined using a timing advance command; and
adjusting, by the base station, a configuration of a special slot of a radio frame for the UE in response to determining that the UE requires the expanded cell range, the special slot comprising uplink and downlink symbols, the configuration de-prioritizing a final downlink symbol in the special slot.

9. The non-transitory computer-readable storage medium of claim 8, wherein adjusting the configuration of the special slot for the UE comprises increasing an amount of gap symbols in the special slot.

10. The non-transitory computer-readable storage medium of claim 9, wherein increasing the amount of gap symbols in the special slot comprises replacing at least one downlink symbol adjacent to an existing gap symbol with a new gap symbol.

11. The non-transitory computer-readable storage medium of claim 9, wherein increasing the amount of gap symbols in the special slot comprises issuing a Radio Resource Control (RRC) reconfigure command to the UE, the RRC reconfigure command identifying the amount of gap symbols in the special slot.

12. The non-transitory computer-readable storage medium of claim 8, wherein adjusting the configuration of the special slot for the UE comprises transmitting a command to the UE causing the UE to prioritize uplink transmissions in the special slot over downlink transmissions.

13. The non-transitory computer-readable storage medium of claim 12, wherein adjusting the configuration of the special slot for the UE comprises reserving at least one downlink symbol in the special slot, the at least one downlink symbol adjacent to a gap symbol, wherein reserving the at least one downlink symbol comprises disabling scheduling of downlink transmissions in the at least one downlink symbol.

14. The non-transitory computer-readable storage medium of claim 8, wherein the radio frame is configured in a DDDSU permutation.

15. A device comprising:
a processor configured to:
communicate with a user equipment (UE) using a first frequency in a time division duplexing (TDD) mode;
determine that the UE requires an expanded cell range if a distance to the UE is within a threshold distance from a normal cell range of the device, wherein the distance is determined using a timing advance command; and
adjust a configuration of a special slot of a radio frame for the UE in response to determining that the UE requires the expanded cell range, the special slot comprising uplink and downlink symbols, the configuration de-prioritizing a final downlink symbol in the special slot.

16. The device of claim 15, wherein adjusting the configuration of the special slot for the UE comprises increasing an amount of gap symbols in the special slot.

17. The device of claim 16, wherein increasing the amount of gap symbols in the special slot comprises replacing at least one downlink symbol adjacent to an existing gap symbol with a new gap symbol.

18. The device of claim 15, wherein adjusting the configuration of the special slot for the UE comprises transmitting a command to the UE causing the UE to prioritize uplink transmissions in the special slot over downlink transmissions.

19. The device of claim 18, wherein adjusting the configuration of the special slot for the UE comprises reserving at least one downlink symbol in the special slot, the at least one downlink symbol adjacent to a gap symbol, wherein reserving the at least one downlink symbol comprises disabling scheduling of downlink transmissions in the at least one downlink symbol.

20. The device of claim 15, wherein the radio frame is configured in a DDDSU permutation.

* * * * *